United States Patent

[11] 3,625,980

[72] Inventor Gerald L. Bachman
 Kirkwood, Mo.
[21] Appl. No. 694,790
[22] Filed Jan. 2, 1968
[45] Patented Dec. 7, 1971
[73] Assignee Monsanto Company
 St. Louis, Mo.

[54] HALOGENATED ANILINO COUMARIN COMPOUNDS
 10 Claims, No Drawings
[52] U.S. Cl.................................................. 260/343.2 R,
 424/281
[51] Int. Cl............................................... C07d 7/28

[50] Field of Search........................................... 260/343.2

[56] References Cited
OTHER REFERENCES
Newman et al. J. Org. Chem., Vol. 30 (12/1965), page 4131.

*Primary Examiner*—James A. Patten
*Attorneys*—Neal E. Willis and Arnold H. Cole ABSTRACT: This disclosure covers certain halogenated anilino coumarins as new chemical compounds. These compounds have been found to be useful in the control of bacteria and fungi.

HALOGENATED ANILINO COUMARIN COMPOUNDS

This invention relates to a novel class of organic chemical compounds. More particularly, this invention is concerned with novel anilino derivatives of 3-chloro and other halogenated coumarins. Such materials have been found to possess useful and unexpected biological activity.

The novel compounds of this invention have the formula

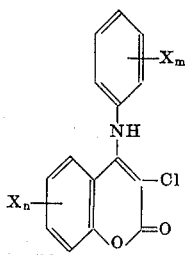

wherein X is selected from chlorine and bromine, $n$ is an integer from zero to 2, $m$ is an integer from zero to 3, and the sum of $m+n$ is at least 1.

The novel halogenated anilino coumarins of this invention can be readily prepared by reacting an aniline with a halogenated coumarin. A typical reaction is illustrated by the following equation:

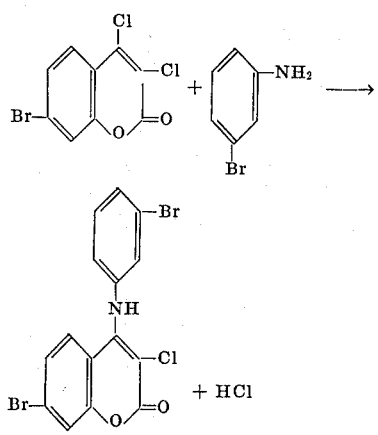

This type of reaction is known in the art. For example, the preparation of the unhalogenated 4-anilino coumarin is shown in Zhur. Obshchei Khim., Vol. 30, pages 1378-79 (1960); Chem. Abstr., Vol. 55, page 524$f$ (1961).

The invention will be more fully understood by reference to the following examples which are set forth herein for purposes of illustration only. Such examples are not to be construed as limiting the scope of the present invention in any manner.

EXAMPLE 1

A suitable reaction vessel is charged with a mixture of 5.0 grams (0.02 mol) of 3,4,6,-trichlorocoumarin and 6.5 grams (0.04 mol) of 3,4-dichloroaniline. The mixture is heated at about 200° C. for a period of one-half hour. It is then cooled and diethyl ether is added. The ether extract is separated and the solvent is removed by evaporation. The residual oil is induced to crystallize from methylcyclohexane. The product obtained is then recrystallized from methylcyclohexane to yield 3,6-dichloro-4-(3,4-dichloroanilino)coumarin as a yellow solid, m.p. 278°-9° C. Analysis shows 3.35 percent nitrogen as against a calculated value of 3.7 percent.

EXAMPLE 2

Following the detailed procedure of example 1, the reactants employed are 0.02 mol of 3,4-dichlorocoumarin and 0.04 mol of 3,4,5-trichloroaniline. The produce obtained is 3-chloro-4-(3,4,5-trichloroanilino)coumarin.

EXAMPLE 3

Following the detailed procedure of example 1, the reactants employed are 0.02 mol of 3,4,8-trichlorocoumarin and 0.04 mol of 4-bromoaniline. The product obtained is 3,8-dichloro-4-(4-bromoanilino)coumarin.

EXAMPLE 4

Following the detailed procedure of example 1, the reactants employed are 0.02 mol of 3,4,6,8-tetrachlorocoumarin and 0.04 mol of 3,4-dibromoaniline. The product obtained is 3,6,8-trichloro-4-(3,4-dichloroanilino)coumarin.

EXAMPLE 5

Following the detailed procedure of example 1, the reactants employed are 0.02 mol of 3,4,7-trichlorocoumarin and 0.04 mol of aniline. The product obtained is 3,7-dichloro-4-anilinocoumarin.

As stated above, the products of the present invention possess useful and unexpected biological activity, and they are particularly adapted to be employed for the control of fungi and gram positive bacterial organisms. In a standard, art-recognized test, 3,6-dichloro-4-(3,4-dichloroanilino)coumarin is found to be effective against the growth of *Staphylococcus aureus*, a representative gram positive species, at a dilution in excess of 1 part per 10,000. In a similar standard, art-recognized test, the same compound was also found to be effective against the growth of Aspergillus niger, a representative species of fungus, at a dilution in excess of 1 part per 1,000,000. Similar activity is displayed by other and different halogenated anilino coumarin compounds of this invention.

While the invention has been described herein with regard to certain specific embodiments, it is not so limited. It is to be understood that variations and modification thereof may be made by those skilled in the art without departing from the spirit and scope of the invention.

I claim:

1. A compound of the formula

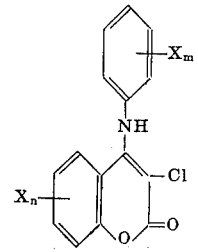

wherein X is selected from chlorine and bromine, $m$ is an integer from zero to 3, $n$ is an integer from zero to 2, and the sum of $m+n$ is at least 2.

2. A compound as defined in claim 1 wherein X is chlorine.
3. A compound as defined in claim 1 wherein X is bromine.
4. A compound as defined in claim 1 wherein the sum of $m+n$ is 2.
5. A compound as defined in claim 1 wherein the sum of $m+n$ is 3.
6. A compound as defined in claim 1 wherein the sum of $m$ $n$ is 4.
7. A compound as defined in claim 4 wherein X is chlorine.
8. A compound as defined in claim 5 wherein X is chlorine.
9. A compound as defined in claim 6 wherein X is chlorine.
10. 3,6-Dichloro-4-(3,4-dichloroanilino)coumarin.

* * * * *